(12) United States Patent
Han et al.

(10) Patent No.: US 11,865,490 B2
(45) Date of Patent: Jan. 9, 2024

(54) MULTI-COMPARTMENT BED RADIAL FLOW ADSORBER CAPABLE OF REALIZING LARGE TELESCOPIC DEFORMATION

(71) Applicant: HANGZHOU OXYGEN PLANT GROUP CO., LTD., Hangzhou (CN)

(72) Inventors: Yisong Han, Hangzhou (CN); Xiuna Lin, Hangzhou (CN); Yi Gao, Hangzhou (CN); Yun Wu, Hangzhou (CN); Hongli Xia, Hangzhou (CN); Xudong Peng, Hangzhou (CN); Yunsong Han, Hangzhou (CN)

(73) Assignee: HANGZHOU OXYGEN PLANT GROUP CO., LTD., Hangzhou (CN)

( * ) Notice: Subject to any disclaimer, the term of this patent is extended or adjusted under 35 U.S.C. 154(b) by 211 days.

(21) Appl. No.: 17/477,612

(22) Filed: Sep. 17, 2021

(65) Prior Publication Data
US 2022/0152547 A1     May 19, 2022

(30) Foreign Application Priority Data
Jul. 17, 2020   (CN) .......................... 202010690992.0

(51) Int. Cl.
*B01D 53/04* (2006.01)

(52) U.S. Cl.
CPC .......... *B01D 53/0431* (2013.01); *B01D 53/04* (2013.01); *B01D 53/0407* (2013.01); *B01D 53/0462* (2013.01); *B01D 2257/504* (2013.01); *B01D 2257/7022* (2013.01); *B01D 2257/80* (2013.01); *B01D 2259/4009* (2013.01)

(58) Field of Classification Search
None
See application file for complete search history.

(56) References Cited

U.S. PATENT DOCUMENTS

| | | | | |
|---|---|---|---|---|
| 4,364,753 A * | 12/1982 | Wagner | ............. | B01D 53/0438 55/475 |
| 4,541,851 A * | 9/1985 | Bosquain | ............. | B01D 53/261 96/126 |
| 5,509,956 A * | 4/1996 | Opperman | ............. | B01J 8/0214 96/123 |
| 6,086,659 A * | 7/2000 | Tentarelli | ............... | B01J 8/0411 96/151 |
| 2011/0206581 A1* | 8/2011 | Ackley | .................... | B01J 8/008 29/446 |

* cited by examiner

*Primary Examiner* — Gabriel E Gitman
(74) *Attorney, Agent, or Firm* — PROI Intellectual Property US; Klaus Michael Schmid

(57) ABSTRACT

A multi-compartment bed radial flow adsorber capable of realizing large telescopic deformation mainly comprises an adsorber body, the adsorber body consists of an upper seal head, a barrel, a lower seal head and a pressed shell connected with an upper connecting pipe and a lower connecting pipe, the upper seal head and the lower seal head of the shell are each provided with an upper gas inlet and outlet pipe and a lower gas inlet and outlet pipe, a supporting seat is arranged at the bottom in the shell, an adsorption barrel is arranged above the supporting seat and consists of a plurality of concentric barrels with different diameters, a plurality of annular spaces are formed by the concentric barrels with different diameters, different types of adsorbents can be filled in the annular spaces, and the adsorption barrel is composed of a pore plate or a grid.

4 Claims, 3 Drawing Sheets

MULTI-COMPARTMENT BED RADIAL FLOW ADSORBER CAPABLE OF REALIZING LARGE TELESCOPIC DEFORMATION

TECHNICAL FIELD

The disclosure relates to a multi-compartment bed radial flow adsorber capable of realizing large telescopic deformation, and belongs to the field of gas separation.

BACKGROUND

In an air separation device for separating oxygen and nitrogen through a deep refrigeration method, the role of a purification system is to pretreat air and remove impurities such as moisture, CO2, acetylene and part of hydrocarbon in the air. The adsorber is core equipment of a purification system, foreign gas molecules are removed by utilizing the physical adsorption principle of adsorbents, and the adsorbents adsorb the foreign gas molecules at normal temperature and desorb the foreign gas molecules at high temperature for regeneration. Therefore, the adsorber generally works under the working condition of temperature alternation, and equipment internal parts are deformed after being heated, so that a large expansion amount is generated.

In the design of a traditional multi-compartment bed radial flow adsorber, a plurality of annular spaces are formed by an inner barrel, a plurality of middle barrels and an outer barrel (hereinafter referred to as the inner barrel, the middle barrels and the outer barrel), and the adsorbents are placed in the annular spaces. For example, a double-compartment bed radial flow adsorber is generally composed of an inner concentric grid barrel, a middle concentric grid barrel and an outer concentric grid barrel, the upper end of each grid barrel is fixed to an upper seal head of equipment in a welded mode, the three layers of grids are connected together through a bottom plate at the lower end of each grid barrel, and therefore the adsorbents and the internal parts are all fixedly suspended on the upper seal head of the equipment. In the working process of the adsorber, high-temperature gas for regeneration passes through the inner barrel, the middle barrels and the outer barrel in sequence, due to the difference of desorption heat of the foreign gas molecules, the temperature rise of the three layers of grid barrels is not synchronous, and the thermal elongation of the three layers of grid barrels is different. Due to the constraint of the upper end and the lower end, the three layers of grid barrels are mutually dragged and need to be deformed and coordinated respectively. Therefore, in different regeneration time periods, very large temperature difference stress can be generated in the grids, and periodic deformation of the three layers of grid barrels is caused.

Another single-compartment bed radial flow adsorber, as described above, is free of a middle barrel. The upper ends of the inner barrel and the outer barrel are fixed on the upper seal head and are borne by the upper seal head, and the lower ends of the inner barrel and the outer barrel are suspended. After being heated, the inner barrel and the outer barrel are mutually deformed and coordinated. In this way, the inner barrel and the outer barrel need to bear load, stretch out and draw back to deform, and gravity and thermal stress are mutually superposed, so that the length of a single-compartment bed in the axial direction cannot be too long, otherwise, the combined stress easily exceeds the allowable stress of materials, and the grids are damaged.

Another radial flow adsorber is provided with a bidirectional deformable constraint net, the upper end and the lower end of the bidirectional deformable constraint net are fixed on the upper seal head and the lower seal head, and the pore plate constraint net is deformed by changing the pattern structure of a pore plate net, so that the purpose of reducing the temperature difference stress is achieved. However, the expansion amount of overlarge and overlong equipment is large. After the pore plate net is deformed, the radial deformation of the bed structure is too large, and the paths of airflows at different heights flowing through the bed are different, so that the use performance of the adsorber is influenced, or the pore plate net is broken.

Especially for super-huge type radial flow adsorber equipment, the treated gas amount is larger and larger, and the diameter is limited under the condition that transportation is limited, so that the design of the equipment can only be lengthened in the axial direction, the thermal elongation is too large, the stress of the pore plate or the grid barrel during working exceeds the allowable stress of materials, and the inner grid barrel, the middle grid barrel and the outer grid barrel are required to have special structural design capable of absorbing large telescopic deformation. Therefore, there is a need for a radial flow adsorber which has a reliable and innovative structural design and can prevent three layers of concentric barrels generated after being heated from freely telescoping under different large telescoping amounts under a large-temperature-difference alternating working condition, so that the temperature difference stress among the barrels in each layer is reduced or even eliminated, and the safety and reliability of equipment operation are improved.

SUMMARY

The disclosure aims to provide a vertical multi-compartment bed radial flow adsorber capable of realizing large telescopic deformation for large-scale air separation under the severe environment of large temperature difference alternation when equipment works, and through the innovative structural design, the temperature difference stress generated by mutual constraint and coordination between internal parts is reduced or even eliminated, and the use quality of products is ensured. The purpose of the disclosure is obtained through the following technical scheme: the multi-compartment bed radial flow adsorber capable of realizing large telescopic deformation, mainly comprising an adsorber body, the adsorber body consisting of an upper seal head, a barrel, a lower seal head and a pressed shell connected with an upper connecting pipe and a lower connecting pipe, the upper seal head and the lower seal head of the shell are each provided with an upper gas inlet and outlet pipe and a lower gas inlet and outlet pipe, a supporting seat is arranged at the bottom in the shell, an adsorption barrel is arranged above the supporting seat and consists of a plurality of concentric barrels with different diameters, a plurality of annular spaces are formed by the concentric barrels with different diameters, different types of adsorbents can be filled in the annular spaces, and the adsorption barrel is composed of a pore plate or a grid.

Preferably, the adsorption barrel consists of an inner barrel, a middle barrel and an outer barrel, the lower ends of the inner barrel, the middle barrel and the outer barrel are respectively and fixedly connected onto a supporting seat, the supporting seat is fixedly connected with a support on the barrel, the inner barrel and the middle barrel are in sliding connection with the upper seal head assembly, the outer barrel is fixedly connected with the upper seal head, the inner barrel and the middle barrel can independently and freely stretch out and draw back in the axial direction of the barrel, and the bottom of the supporting seat is fixed, can deform upwards when heated and can freely expand and contract in the radial direction.

Preferably, the adsorption barrel consists of an inner barrel and an outer barrel, the lower ends of the inner barrel and the outer barrel are respectively and fixedly connected onto a supporting seat, the supporting seat is fixedly or detachably connected with a support on the barrel, the inner barrel is in sliding connection with the upper seal head assembly, the outer barrel is fixedly connected with the upper seal head, the inner barrel can independently and freely stretch out and draw back in the axial direction of the barrel, and the bottom of the supporting seat is fixed, can deform upwards when heated and can freely expand and contract in the radial direction.

Preferably, the adsorption barrel consists of an inner barrel, a plurality of middle barrels and an outer barrel, the lower ends of the inner barrel, the middle barrels and the outer barrel are respectively and fixedly connected onto a supporting seat, the supporting seat is fixedly or detachably connected with a support on the barrel, the inner barrel and the middle barrels are in sliding connection with the upper seal head assembly, the outer barrel is fixedly connected with the upper seal head, the inner barrel and the middle barrels can independently and freely stretch out and draw back in the axial direction of the barrel, and the bottom of the supporting seat is fixed, can deform upwards when heated and can freely expand and contract in the radial direction.

The disclosure has the characteristics of simple structure and convenience in operation, and can reduce or even eliminate the temperature difference stress generated by mutual constraint and coordination of internal parts, so that the product quality is ensured, and the service life is prolonged.

DESCRIPTION OF EMBODIMENTS

Figure 1:
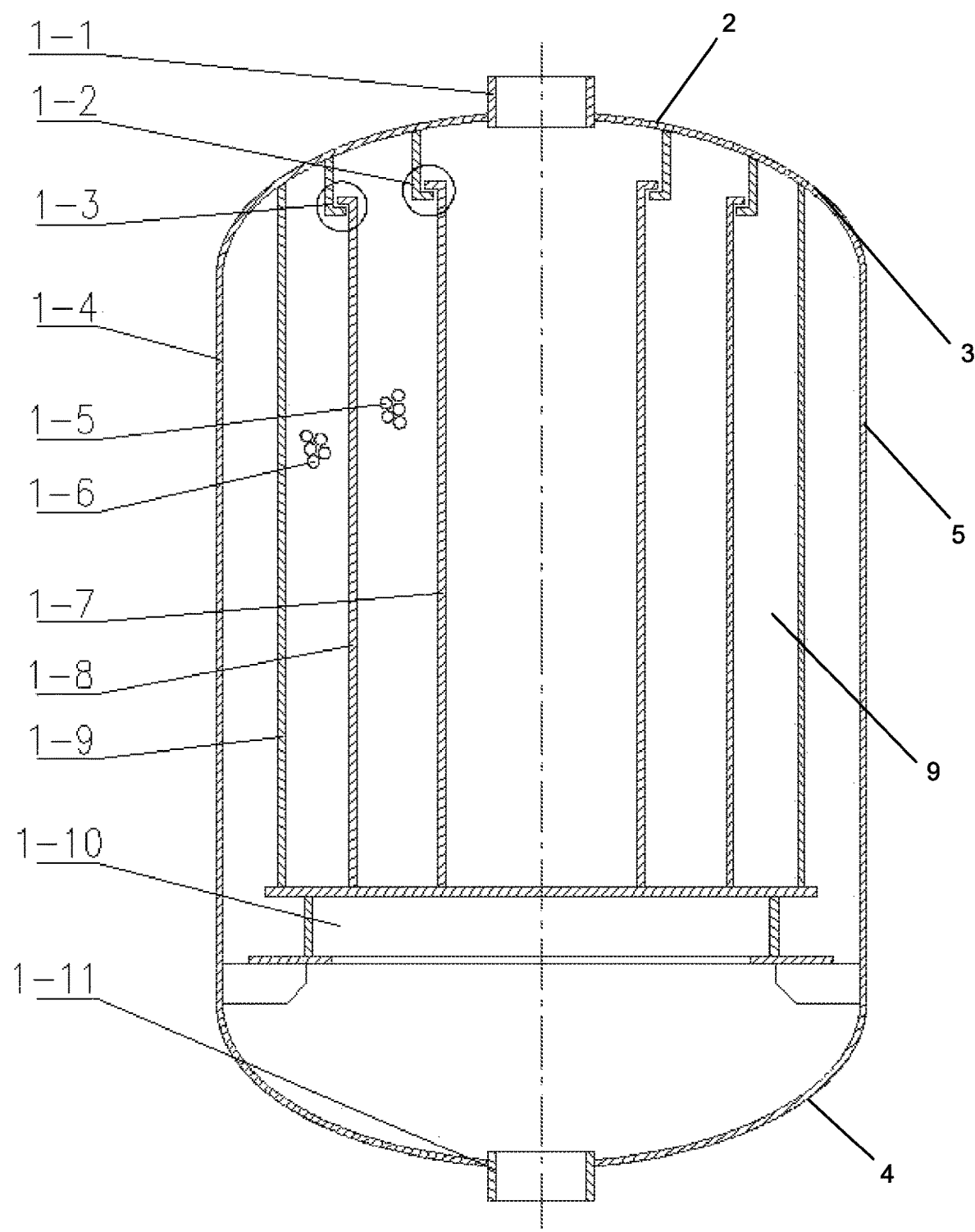
FIG. 1 is a structural diagram of the disclosure.

The disclosure will be described in detail below in combination with attached drawings: as shown in FIG. 1, the multi-compartment bed radial flow adsorber capable of realizing large telescopic deformation mainly comprises an adsorber body 1, the adsorber body 1 consists of an upper seal head 2, a barrel 3, a lower seal head 4 and a pressed shell 5 connected with an upper connecting pipe and a lower connecting pipe, the upper seal head 2 and the lower seal head 4 of the shell are each provided with an upper gas inlet and outlet pipe 1-1 and a lower gas inlet and outlet pipe 1-11, a supporting seat 1-10 is arranged at the bottom in the shell, an adsorption barrel 9 is arranged above the supporting seat 1-10 and consists of a plurality of concentric barrels 10 with different diameters, a plurality of annular spaces 11 are formed by the concentric barrels 10 with different diameters, different types of adsorbents 1-5 can be filled in the annular spaces 11, the adsorption barrel 9 is composed of a pore plate or a grid, the adsorption barrel 9 consists of an inner barrel 1-7, a middle barrel 1-8 and an outer barrel 1-9, the lower ends of the inner barrel 1-7, the middle barrel 1-8 and the outer barrel 1-9 are respectively and fixedly connected onto the supporting seat 1-10, the supporting seat 1-10 is fixedly connected with a support on the barrel 3, the inner barrel 1-7 and the middle barrel 1-8 are in sliding connection with the upper seal head assembly 2, the outer barrel 1-9 is fixedly connected with the upper seal head 2, the inner barrel 1-9 and the middle barrel 1-8 can independently and freely stretch out and draw back in the axial direction of the barrel 3, and the bottom of the supporting seat 1-10 is fixed, can deform upwards when heated and can freely expand and contract in the radial direction.

Figure 2:
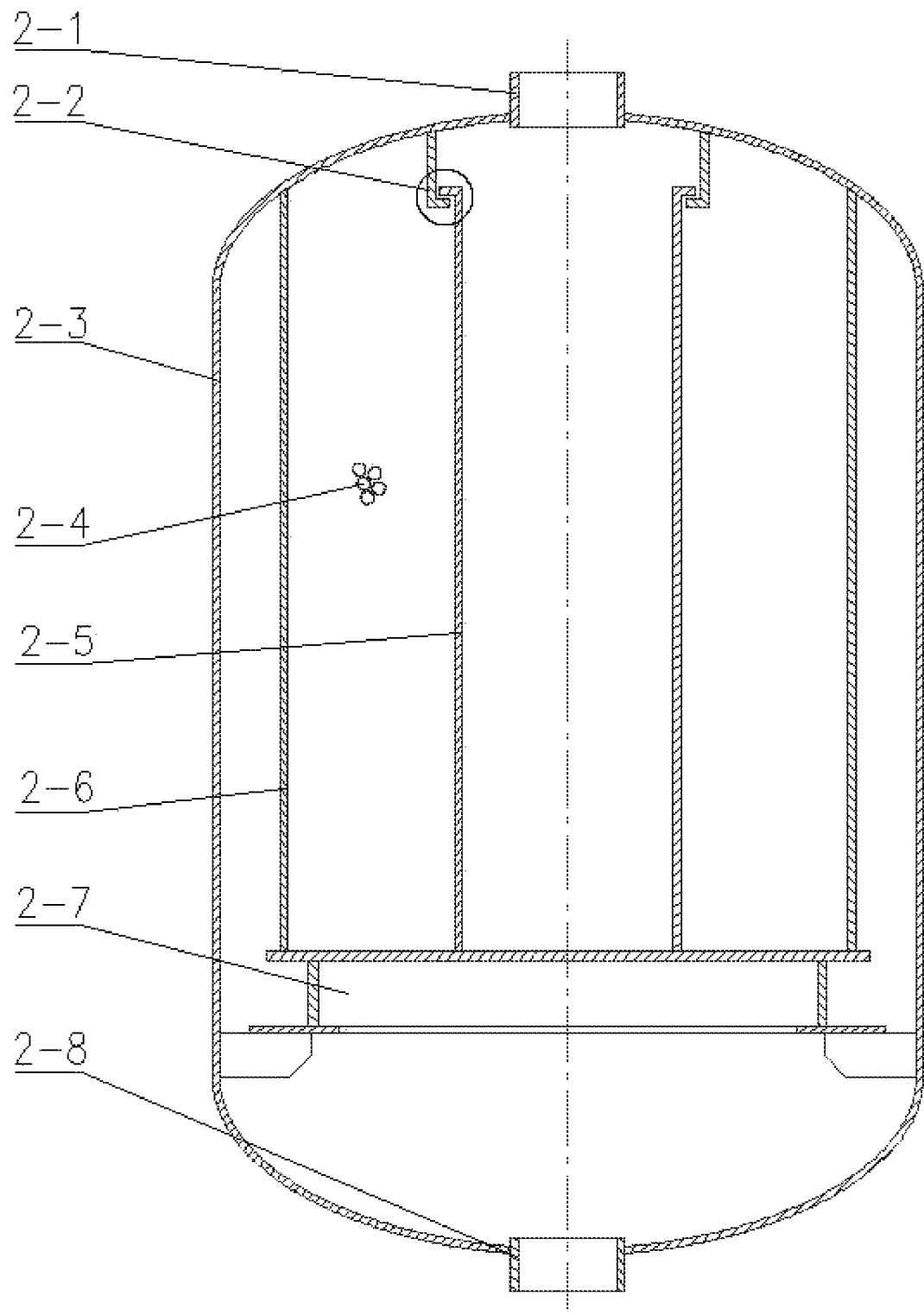
FIG. 2 is a second structural diagram of the disclosure.

As shown in FIG. 2, the adsorption barrel consists of an inner barrel 2-5 and an outer barrel 2-6, the lower ends of the inner barrel 2-5 and the outer barrel 2-6 are respectively and fixedly connected onto a supporting seat 2-7, the supporting seat 2-7 is fixedly or detachably connected with a support on the barrel 3, the inner barrel 2-5 is in sliding connection with the upper seal head assembly 2, the outer barrel 2-6 is fixedly connected with the upper seal head 2, the inner barrel 2-5 can independently and freely stretch out and draw back in the axial direction of the barrel, and the bottom of the supporting seat 2-7 is fixed, can deform upwards when heated and can freely expand and contract in the radial direction.

Figure 3:
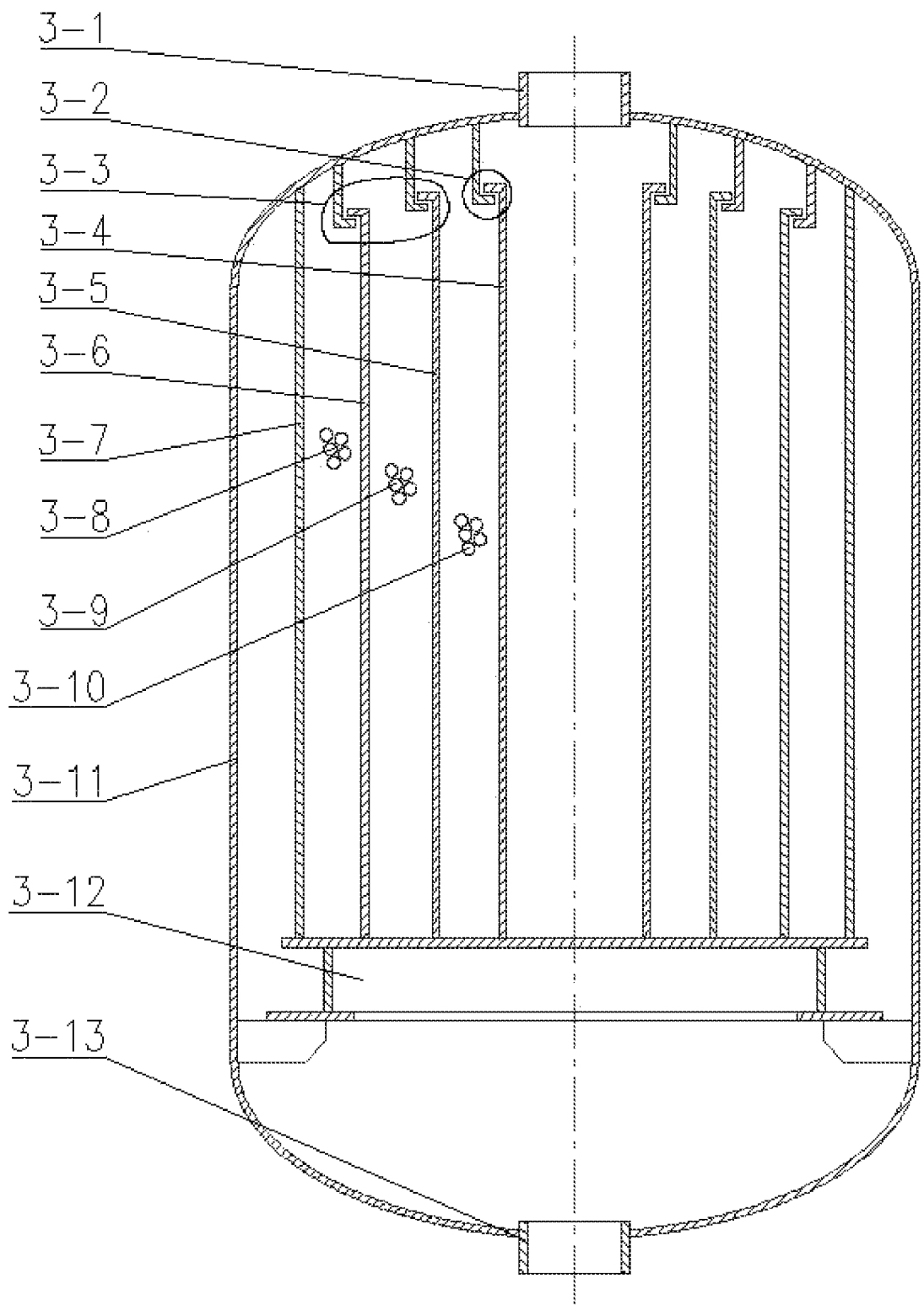
FIG. 3 is a third structural diagram of the disclosure.

As shown in FIG. 3, the adsorption barrel consists of an inner barrel 3-4, a plurality of middle barrels 3-5 and an outer barrel 3-7, the lower ends of the inner barrel 3-4, the middle barrels 3-5 and the outer barrel 3-7 are respectively and fixedly connected onto a supporting seat 3-12, the supporting seat 3-12 is fixedly or detachably connected with a support on the barrel 3, the inner barrel 3-4 and the middle barrels 3-5 are in sliding connection with the upper seal head assembly 2, the outer barrel 3-7 is fixedly connected with the upper seal head 2, the inner barrel 3-4 and the middle barrels 3-5 can independently and freely stretch out and draw back in the axial direction of the barrel 3, and the bottom of the supporting seat 3-12 is fixed, can deform upwards when heated and can freely expand and contract in the radial direction.

The specific working principle in FIG. 1 is as follows:
In the adsorption working stage, processing air enters equipment through the lower gas inlet and outlet pipe 1-11, flows into a peripheral runner composed of a pressed shell 1-4 and the outer barrel 1-9, sequentially passes through the outer barrel 1-9, the middle barrel 1-8 and the inner barrel 1-7, is treated by an adsorbent 1-6 and an adsorbent 1-5 placed in the three layers of concentric barrels, flows out of the equipment through an upper gas inlet and outlet pipe 1-1, and enters a downstream process device. In the working process of the adsorption stage, the role of a middle barrel sealing structure 1-3 and an inner barrel sealing structure 1-2 is to prevent processing air from being directly short-circuited and penetrated without being treated by the adsorbents.

In the initial heating process of a regeneration stage, high-temperature regeneration gas enters the equipment through the upper gas inlet and outlet pipe 1-1, passes through the inner barrel 1-7 and then flows through the adsorbent 1-6, at the moment, the inner barrel 1-7 is heated to expand, and the middle barrel 1-8, the outer barrel 1-9 and the pressed shell 1-4 are all in a normal-temperature state. As the heating process proceeds, the high-temperature regenerated gas sequentially heats the inner barrel, the middle barrel, the outer barrel and the adsorbents placed in the barrels. In the beginning of the heating process, the temperature difference between the inner barrel and other internal parts in the equipment is the maximum. At the moment, the inner barrel sealing structure 1-2 can achieve axial free extension of the inner barrel and is not dragged by other inner parts. Along with the heating process, heat is continuously input, the temperature of the middle barrel 1-8 rises, the outer barrel 1-9 and the barrel of the equipment are still in the normal-temperature state, and at the moment, the middle barrel sealing structure 1-3 can enable the middle barrel to freely extend in the axial direction and not to be dragged by other internal parts.

In the cold blowing process of the regeneration stage, normal-temperature regenerated gas flows into the equipment from the upper gas inlet and outlet pipe, the internal parts of the equipment and the adsorbents have a cooling process, and due to the existence of the sealing structure, the inner barrel and the middle barrel stretch and retract independently at any time period and cannot be dragged by the other internal parts. A gas flow channel is arranged between the outer barrel 1-9 and the pressed shell 1-4, so that the outer barrel 1-9 and the pressed shell 1-4 do not have very large temperature difference under any working condition, and the axial expansion of the outer barrel 1-9 and the pressed shell 1-4 is synchronous.

Due to the arrangement of the supporting device 1-10, the weight of the adsorbents and all the internal parts acts on the supporting device 1-10. The role of the supporting device is to bear the total weight of the adsorbents and the internal parts and transmit the weight to the barrel, and the whole circle of the barrel is evenly borne. The supporting device also works in a temperature alternating state, and during structural design, fixed connection between the supporting device and the support of the barrel needs to be considered, and preferably, connecting fasteners such as bolts need to be taken into consideration. The supporting device can achieve free expansion and contraction in the radial direction, and meanwhile the supporting device is fixed downwards and can deform upwards in the axial direction.

The specific working principle in FIG. 2 is as follows:

The disclosure is described in detail below in combination with an attached drawing: working of the radial flow adsorber is divided into an adsorption stage and a regeneration stage, wherein the regeneration stage is further divided into the processes of pressure reduction, heating, cold blowing, pressure increase and the like.

In the adsorption working stage, processing air enters the equipment through the lower gas inlet and outlet pipe 2-8, flows into a peripheral runner composed of a pressed shell 2-3 and the outer barrel 2-6, sequentially passes through the outer barrel 2-6 and the inner barrel 2-5, is treated by an adsorbent 2-4 placed in the two layers of concentric barrels, flows out of the equipment through an upper gas inlet and outlet pipe 2-1, and enters a downstream process device. In the working process of the adsorption stage, the role of an inner barrel sealing structure 2-2 is to prevent processing air from being directly short-circuited and penetrated without being treated by the adsorbent.

In the heating process of the regeneration stage, high-temperature regeneration gas enters the equipment through the upper gas inlet and outlet pipe 2-1, passes through the inner barrel 2-5 and then flows through the adsorbent 2-4, at the moment, the inner barrel is heated to expand, and the outer barrel 2-6 and the pressed shell 2-3 are all in the normal-temperature state. As the heating process proceeds, the high-temperature regenerated gas sequentially heats the inner barrel, the middle barrel, the outer barrel and the adsorbents placed in the barrels. In the beginning of the heating process, the temperature difference between the inner barrel and other internal parts in the equipment is the maximum. At the moment, the inner barrel sealing structure 2-2 can achieve axial free extension of the inner barrel and is not dragged by other inner parts. In the cold blowing process of the regeneration stage, normal-temperature regenerated gas flows into the equipment from the upper gas inlet and outlet pipe, the internal parts of the equipment and the adsorbent have a cooling process, and due to the existence of the sealing structure, the inner barrel stretches and retracts independently at any time period and cannot be dragged by the other internal parts. The temperature of a gas flow channel between the outer barrel 2-6 and the pressed shell 2-3 rises, so that the outer barrel and the pressed shell do not have very large temperature difference under any working condition, and the axial expansion of the outer barrel and the pressed shell is synchronous. No coordinated deformation exists between the inner barrel and the outer barrel, and therefore the temperature difference stress is eliminated. Under the condition of large expansion amount, the inner barrel and the outer barrel cannot be damaged, and the safety of the equipment is ensured.

The specific working principle in FIG. 3 is as follows:

In the adsorption working stage, processing air enters the equipment through the lower gas inlet and outlet pipe 3-13, flows into a peripheral runner composed of a pressed shell 3-11 and the outer barrel 3-7, sequentially passes through the outer barrel 3-7, a second middle barrel 3-6, a first middle barrel 3-5 and the inner barrel 3-4, is treated by a first adsorbent 3-8 and a second adsorbent 3-9 placed in the multiple layers of concentric barrels, flows out of the equipment through an upper gas inlet and outlet pipe 3-1, and enters a downstream process device. In the working process of the adsorption stage, the role of a middle barrel sealing structure 3-3 and an inner barrel sealing structure 3-2 is to prevent processing air from being directly short-circuited and penetrated without being treated by the adsorbents.

In the heating process of the regeneration stage, high-temperature regeneration gas enters the equipment through the upper gas inlet and outlet pipe 3-1, passes through the inner barrel 3-4 and then flows through the second adsorbent 3-9 and the first adsorbent 3-8, at the moment, the inner barrel, the first middle barrel 3-5 and the second middle barrel 3-6 are heated to expand, and the outer barrel 3-6 and the pressed shell 3-11 are all in the normal-temperature state. As the heating process proceeds, the high-temperature regenerated gas sequentially heats the inner barrel, the first middle barrel, the second middle barrel, the outer barrel and the adsorbents placed in the barrels. In the beginning of the heating process, the temperature difference between the inner barrel and other internal parts in the equipment is the maximum. At the moment, the inner barrel sealing structure 3-2 can achieve axial free extension of the inner barrel and is not dragged by other inner parts. In the heating process, the temperature of the first middle barrel and the temperature of the second middle barrel rise slowly, the first middle barrel and the second middle barrel can extend freely, and the grid in the middle barrel cannot generate thermal stress caused by deformation. In the cold blowing process of the regeneration stage, normal-temperature regenerated gas flows into the equipment from the upper gas inlet and outlet pipe, the internal parts of the equipment and the adsorbent have a cooling process, and due to the existence of the sealing structure, the inner barrel, the first middle barrel and the second middle barrel stretch and retract independently at any time period and cannot be dragged by the other internal parts. The temperature of a gas flow channel between the outer barrel and the pressed shell rises, so that the outer barrel and the pressed shell do not have very large temperature difference under any working condition, and the axial expansion of the outer barrel and the pressed shell is synchronous. No coordinated deformation exists between the inner barrel and the outer barrel, between the first middle barrel and the outer barrel and between the second middle barrel and the outer barrel, and therefore the temperature difference stress is eliminated. Under the condition of large expansion amount, the inner barrel, the first middle barrel, the second middle barrel and the outer barrel cannot be damaged, and the safety of the equipment is ensured.

What is claimed is:

1. A multi-compartment bed radial flow adsorber capable of realizing telescopic deformation, comprising an adsorber body, the adsorber body comprising:
    an upper seal head,
    a barrel, and
    a lower seal head,
    wherein the upper seal head is provided with an upper gas inlet and outlet pipe, wherein the lower seal head is provided with a lower gas inlet and outlet pipe,
    a supporting seat is arranged at a bottom of the barrel,
    an adsorption barrel is arranged above the supporting seat and comprises a plurality of concentric barrels with different diameters, such that a plurality of annular spaces are formed by the concentric barrels with different diameters, and different types of adsorbents can be filled in the plurality of annular spaces,
    the plurality of concentric barrels are each composed of a pore plate or a grid, and
    the supporting seat comprises a lower annular rim that is suspended by a support extending from an inner surface of the barrel, and the supporting seat can deform upwardly when heated and can freely expand and contract in a radial direction.

2. The multi-compartment bed radial flow adsorber capable of realizing telescopic deformation according to claim 1, the plurality of concentric barrels further comprising:
    an inner barrel,
    a middle barrel, and
    an outer barrel,
    wherein the lower ends of the inner barrel, the middle barrel and the outer barrel are respectively and fixedly connected onto the supporting seat, and
    wherein the inner barrel and the middle barrel are in sliding connection with the upper seal head, and
    wherein the outer barrel is fixedly connected with the upper seal head, and the inner barrel and the middle barrel can independently and freely stretch out and draw back in the axial direction of the barrel.

3. The multi-compartment bed radial flow adsorber capable of realizing telescopic deformation according to claim 1, the plurality of concentric barrels further comprising:
    an inner barrel, and
    an outer barrel,
    wherein the lower ends of the inner barrel and the outer barrel are respectively and fixedly connected onto the supporting seat, and
    wherein the inner barrel is in sliding connection with the upper seal head, and the outer barrel is fixedly connected with the upper seal head, and
    wherein the inner barrel can independently and freely stretch out and draw back in the axial direction of the barrel.

4. The multi-compartment bed radial flow adsorber capable of realizing telescopic deformation according to claim 1, the plurality of concentric barrels further comprising:
    an inner barrel,
    a plurality of middle barrels, and
    an outer barrel,
    wherein the lower ends of the inner barrel, the middle barrels and the outer barrel are respectively fixedly connected to the supporting seat,
    wherein the inner barrel and the middle barrels are in sliding connection with the upper seal head,
    wherein the outer barrel is fixedly connected with the upper seal head, and
    wherein the inner barrel and the middle barrels can independently and freely stretch out and draw back in the axial direction of the barrel.

* * * * *